June 19, 1934.  T. A. PALMER ET AL  1,963,865
BLOCK FEEDER FOR MATCH MACHINES
Filed March 21, 1931
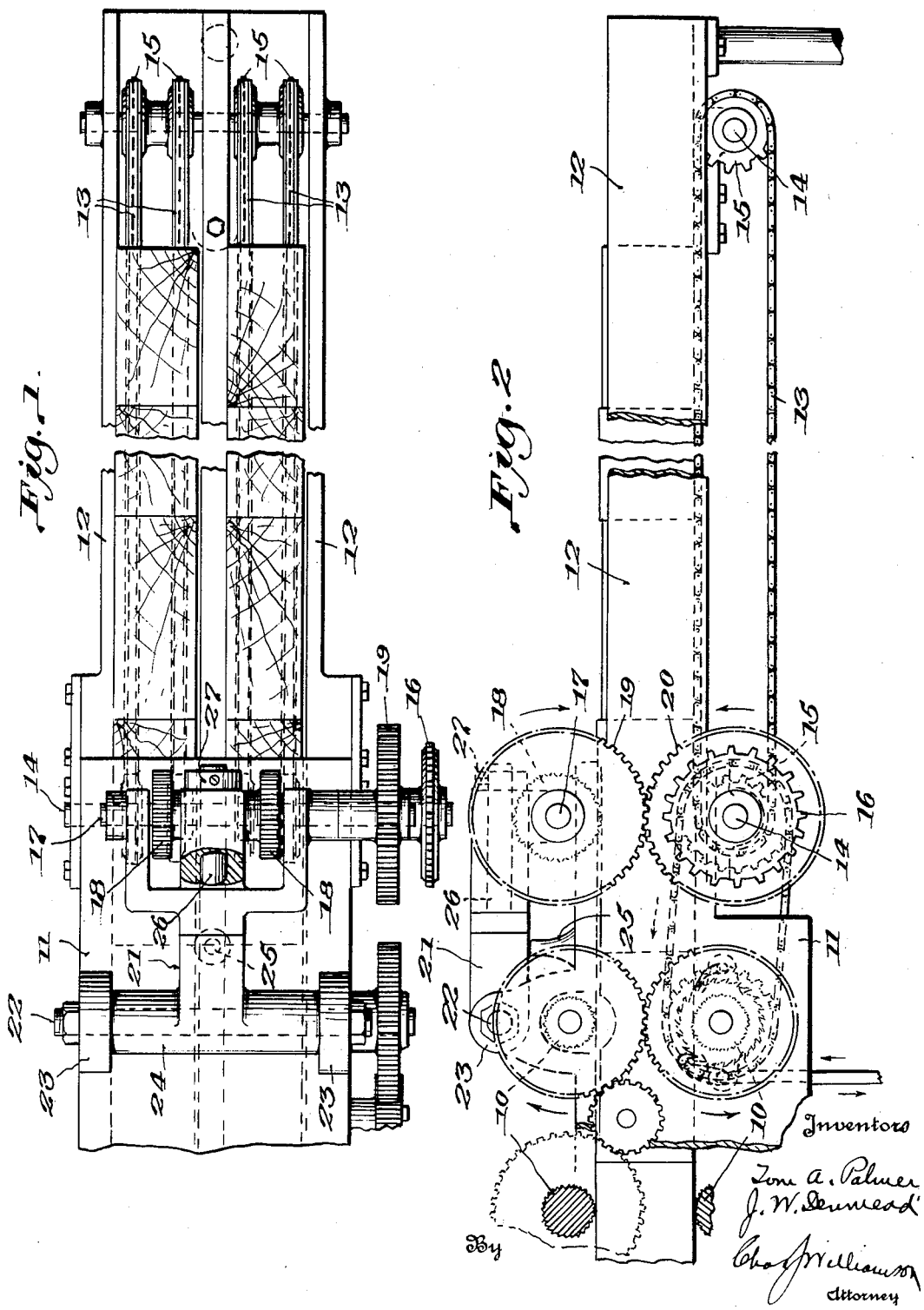

Patented June 19, 1934

1,963,865

UNITED STATES PATENT OFFICE 1,963,865

BLOCK FEEDER FOR MATCH MACHINES

Tom A. Palmer and John W. Denmead, Akron, Ohio, assignors to The Palmer Match Company, Akron, Ohio, a corporation of Ohio Application March 21, 1931, Serial No. 524,375

6 Claims. (Cl. 144—50)

Our invention has to do with the feeding of blocks to the splint cutters of match machines from which splints are cut. The blocks are placed in a trough through which they are passed in lines or rows to feed rollers, situated near the splint cutters or knives, by which they are delivered to the cutters.

The blocks are fed to these feed rollers by feed devices engaging them in the trough. The blocks may become wedged or jammed in the feed rollers which necessitates access to them to free or release or relieve the jam or wedging. Again inequality in the length of the blocks is important to be taken into account. An object of our invention is to provide block feeder mechanism which will enable easy and quick access to jammed blocks. Another object is to assure feed to the feed rollers, notwithstanding variations in block length, in consequence of which the top surfaces of different blocks are at different levels in the trough.

Our invention consists in whatever is defined by or is included within the terms or scope of the appended claims.

In the drawing we illustrate an embodiment of our invention in a type or construction of feeder which is very satisfactory. In such drawing:—

Fig. 1 is a top plan view of such embodiment of our invention;

Fig. 2 is a side elevation thereof with parts broken away to show internal or otherwise hidden parts.

The block feeding mechanism, of course, is a constituent part of the match machine, but it is unnecessary to show in the drawing any portion of the match machine beyond the upper and lower feed rollers 10, which respectively engage the upper and lower sides of blocks of wood in the trough, 11, to deliver them to the splint cutters. From said trough, 11, there is an outwardly extending, horizontal extension 12, with a bottom and two outside and one intermediate vertical walls to constitute two parallel side by side guideways for rows of blocks passing end to end from the outer end of the trough extension, into which they are inserted, to the feed rollers, 10. In the bottom of each guideway travels horizontally a pair of sprocket chains, 13, upon the upper run of which rests the blocks and they are thereby carried onward end to end through the trough. At or near each end of the trough extension, below the same, is a horizontal shaft 14, upon which are sprocket wheels 15, for the respective chains. Motion is imparted to the sprocket chains in some convenient way, as by a driving connection with some shaft of the match machine. As one way, we show upon the sprocket wheel shaft 14, near the feed rollers, 10, a sprocket wheel 16, which by a chain not shown, is connected with a sprocket wheel on some convenient shaft of the match machine.

Directly above the shaft, 14, which has the sprocket wheel, 16, is a horizontal shaft, 17, that extends transversely of the trough, to which are secured two rolls 18, each adapted to rest upon the upper sides of blocks moved onward to the feed rollers, 10, by the travel of the sprocket chains and which rolls are positively driven so that, in cooperation with the sprocket chains engaging the undersides of the blocks, the latter are moved onward to the grip of the feed rollers, 10. For positively driving the rolls, 18, upon one end of the shaft outside the trough is a spur gear, 19, which meshes with a spur gear, 20, on the shaft, 14, below. Said roll-carrying shaft, 17 is journaled in bearings in a forked arm, 21, which is hinged or pivoted on a horizontal axis above the feed rollers, 10, so that the shaft, with its rolls, may be swung upward to lift the rolls and connected parts out of the way to give access to blocks in the bite of the feed rollers, 10, and to swing downward to remesh or reengage the two spur gears which are disengaged by the lifting of the upper gear out of mesh with the lower gear. Said hinge is formed by a horizontal bolt, 22, secured to ears, 23, at opposite sides of the trough and a sleeve 24, fitted upon the bolt and extending between the ears so that it may turn on the bolt while restrained from endwise movement. To limit the downward movement of the roll-carrying frame to secure proper mesh of the gear teeth, the underside of the frame contacts with a stop lug, 25, projecting above the trough cover.

The connection between the forked arm which journals the roll shaft and the sleeve of the hinge is a swivel connection, the swivel having an axis at right angles to the roll-carrying shaft, that is, an axis parallel with the direction of endwise movement of the blocks through the trough, and situated midway between the two rows of blocks, so that an oscillating or turning movement may take place on that axis to allow adjustment of the respective rolls to the blocks on which they rest. Such swivel connection, as shown, includes a round stem, 26, projecting centrally from the hinge sleeve and a round opening, or hole, through the forked arm, provided in part, in a tubular central extension thereof, at the outer end of which is situated a collar 27, which is pinned to a portion of the swivel stem that projects. There is enough play of the teeth of the intermeshing gears to permit the swiveling action of the rolls while retaining enough meshing engagement to drive such rolls.

The necessary feed pressure of the rolls, 18, on the tops of the blocks results from the weight of the parts.

What we claim is:—

1. Block feeding mechanism for match machines for feeding blocks end to end that may vary in length comprising block feeding rollers spaced apart vertically to provide a passage space between them for blocks to be engaged upon their upper and lower sides for feeding, a guide trough leading to said rollers, block feeding means for feeding blocks through the trough to such rollers, including means that engage one of the surfaces of the blocks, and means permitting movement of said surface-engaging means towards and from the path of movement of the blocks to the feed rollers, said surface-engaging means being movable about an axis located above said feed rollers and parallel with the axis thereof to an extent that will expose blocks that may jam said block feeding rollers and other block feeding means acting upon the blocks opposite said first-mentioned block feeding means.

2. Block feeding means as in claim 1 in which the block surface engaging means has a pivotal connection with the trough.

3. Block feeding means as in claim 1 in which the block surface engaging means has a pivotal connection with the trough transversely thereof.

4. Block feeding means as in claim 1 in which the block surface engaging means has a swivel connection with the trough on an axis extending longitudinally of the trough.

5. Block feeding mechanism for match machines for feeding blocks end to end that may vary in length comprising feed rollers spaced apart vertically to provide a passage space between them for blocks to be engaged upon their upper and lower sides for feeding and situated to deliver blocks to splint cutting mechanism, a trough extending outwardly from said rollers, block feeding means for engaging blocks in two side by side rows in the trough, comprising a roll for each row, and an arm carrying said rolls having a hinge connection with the upper side of the trough above said feed rollers.

6. Block feeding mechanism for match machines for feeding blocks end to end that may vary in length comprising feed rollers spaced apart vertically to provide a passage space between them for blocks to be engaged upon their upper and lower sides for feeding and situated to deliver blocks to splint cutting mechanism, a trough extending outwardly from said rollers, block feeding means for engaging blocks in two side by side rows in the trough, comprising a roll for each row, and a swivel connection between said rolls and the top of the trough, the swivel axis being in the direction of travel of the rows of blocks through the trough and said rolls being movable about an axis located above said feed rollers and which extends parallel with the axis of the feed rollers, to an extent that will expose said block feeding rollers to access.

TOM A. PALMER.
JOHN W. DENMEAD.